United States Patent

Sano et al.

[11] Patent Number: 5,130,548
[45] Date of Patent: Jul. 14, 1992

[54] INDICATOR

[75] Inventors: Katsuma Sano; Ryuji Nakamura, both of Shizuoka, Japan

[73] Assignee: Yazaki Corporation, Japan

[21] Appl. No.: 541,205

[22] Filed: Jun. 22, 1990

Related U.S. Application Data

[63] Continuation of Ser. No. 304,598, Feb. 1, 1989, abandoned.

[30] Foreign Application Priority Data

Feb. 3, 1988 [JP] Japan .................. 63-12512[U]
Feb. 18, 1988 [JP] Japan .................. 63-19231[U]

[51] Int. Cl.$^5$ .................................................. G01D 13/28
[52] U.S. Cl. .................................. 250/461.1; 250/463.1; 116/286
[58] Field of Search ............ 250/461.1, 463.1, 466.1, 250/467.1, 462.1, 465.1, 486.1; 40/543, 542; 368/226; 116/286-288, DIG. 36; 362/29, 30

[56] References Cited

U.S. PATENT DOCUMENTS

| 258,801 | 5/1882 | Payson, Jr. | 368/226 |
| 911,401 | 2/1909 | Junghans | 250/463.1 |
| 1,414,628 | 5/1922 | Cuntz | 250/463.1 |
| 1,951,783 | 3/1934 | Beard | 250/461.1 |
| 2,459,694 | 1/1949 | Gordon | 250/486.1 |
| 2,777,228 | 1/1957 | Andrews | 40/542 |
| 4,536,656 | 8/1985 | Sowa | 250/463.1 |

FOREIGN PATENT DOCUMENTS

| 62-282225 | 8/1987 | Japan . | |
| 49457 | 3/1910 | Switzerland | 368/226 |
| 80106 | 6/1919 | Switzerland | 368/226 |

Primary Examiner—Carolyn E. Fields
Attorney, Agent, or Firm—Wigman & Cohen

[57] ABSTRACT

Disclosed is an improved indicator, which includes a scale plate having a pointer rotatably mounted thereon; an ultraviolet light source for illuminating said scale plate; and indicia arranged on the scale plate for indicating a specific value in cooperation with the pointer, each of the indicia including first and second parts, and in which the second part includes fluorescent brightener therein so as to be illuminated when the ultraviolet light source is turned on. When the ultraviolet light source is turned on, particularly at night, the second parts of the indicia will become visible so that the visibility of the indicia is changed from the daylight condition in which the light source is turned off. Namely, an interesting design change of the indicia of the indicator can be obtained.

4 Claims, 3 Drawing Sheets

FIG.3A
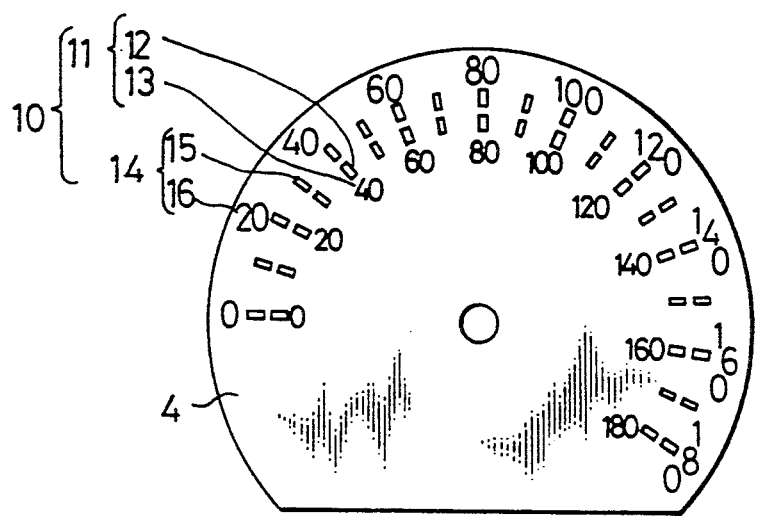
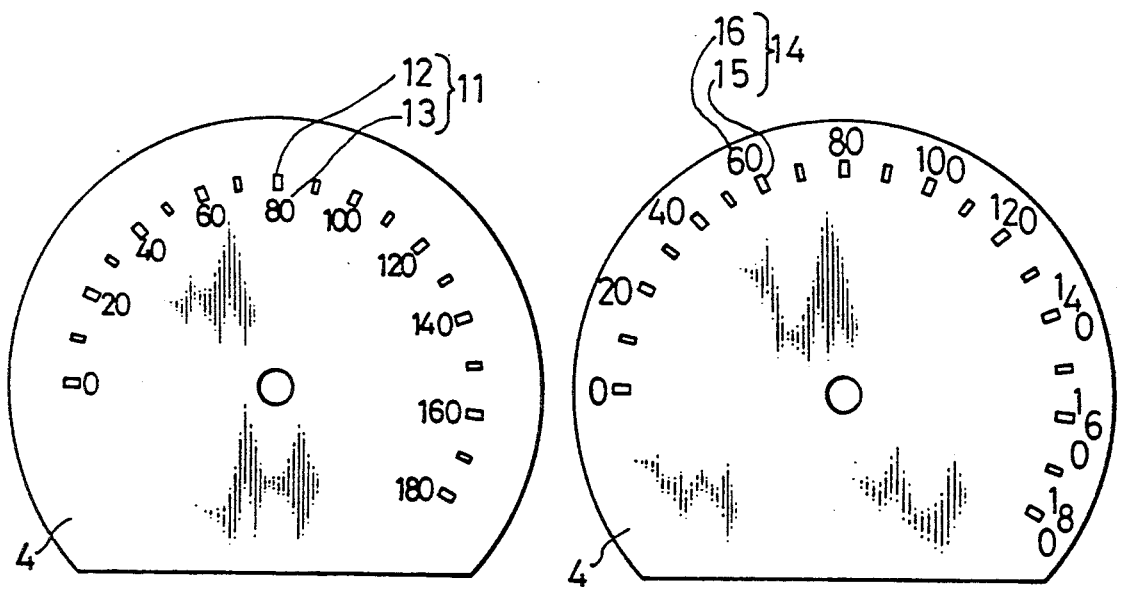
FIG.3B    FIG.3C

INDICATOR

This is a continuation of co-pending application Ser.No. 07/304,598 filed on Feb. 1, 1989, now abandoned.

BACKGROUND OF THE INVENTION

1. Field of the Invention

This invention relates to an indicator, and more particularly to an indicator such as a speedmeter or a tachometer used in motor vehicle, which has an ultraviolet lamp for illuminating indicia, such as scales and numerals arranged on a scale plate of the indicator, containing fluorescent brightener therein for visibility improvement.

2. Description of the Prior Art

One type of prior art indicator, such as a speedmeter or a tachometer for use in motor vehicles, includes an ultraviolet lamp for illuminating indicia, such as scales or numerals, that contain fluorescent brightener therein. In such a conventional indicator, the fluorescent brightener emits visible light when the indicia receive ultraviolet light. Therefore, the luminance of the indicia is good when the ultraviolet lamp is on, which makes the indicia especially visible in the night-time.

However, in the conventional indicator, the fluorescent brightener is simply added directly to the indicia on the scale plate. Therefore, the design of the scale plate, namely the visible arrangement of the indicia in the indicator does not change even if the ultraviolet lamp is turned on or off.

SUMMARY OF THE INVENTION

In view of the conventional indicator, this invention has been made. Accordingly, a main object of the present invention is to provide an indicator having an ultraviolet lamp for illuminating indicia containing fluorescent brightener therein, which can change the visible arrangement of the indicia depending on whether the lamp is turned on or off.

Another object of the present invention is to improve the visibility of the indicia containing fluorescent brightener therein when the ultraviolet light is turned on.

In order to achieve the above objects, the indicator of the present invention comprises: a scale plate having a pointer rotatably mounted thereon; ultraviolet light source for illuminating said scale plate; and indicia arranged on the scale plate for indicating a specific value in cooperation with the pointer, each of the indicia including first and second parts, and the second part containing fluorescent brightener therein so as to be illuminated when the ultraviolet light source is turned on.

According to the indicator having the above structure, when the ultraviolet light source is turned on, particularly at night, the second parts of the indicia will become visible, so that the visible arrangement of the indicia will change from the condition in which the light source is turned off. Namely, useful design change of the indicia of the indicator is made to occur on the scale plate.

Further, the second part of each indicia may be formed of a transparent paint containing fluorescent brightener therein so as to fade away into a ground color of the scale plate under daylight during which the ultraviolet light source is turned off. Furthermore, the first part of each indicia maybe formed of ink which contains no fluorescent brightener therein and fades away into the ground color of the scale plate during night-time. According to these structures, more useful design changes of the indication of the indicator may be obtained.

The objects and advantages of the present invention, as well as the details of the preferred embodiments, will be more fully understood when taken in conjunction with the following drawings.

BRIEF DESCRIPTION OF THE DRAWINGS

FIGS. 3A, 3B and 3C are explanatory drawings showing the change of visible arrangements of the indicia on the scale plate.

DETAILED DESCRIPTION OF THE PREFERRED EMBODIMENTS

Figure 1:
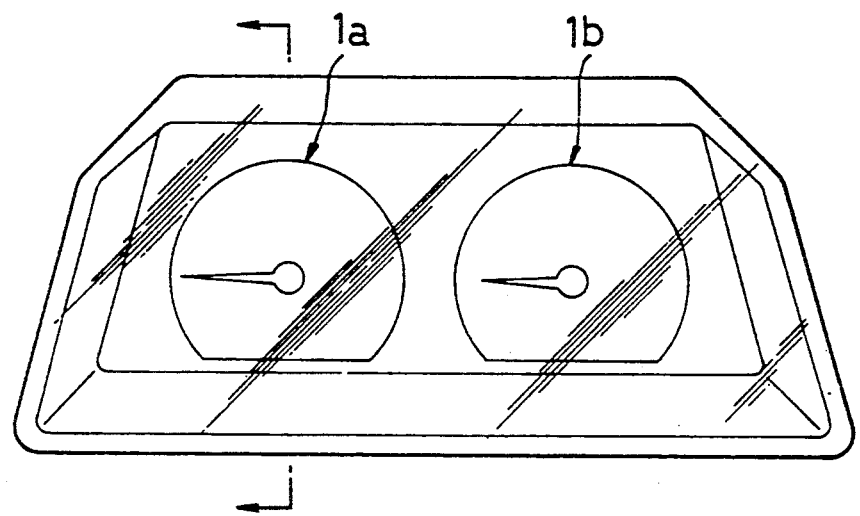
FIG. 1 is a schematic front view of one embodiment of the indicator according to the present invention.

Referring now to the drawings, a preferred embodiment of the present invention will be described.

Figure 2:
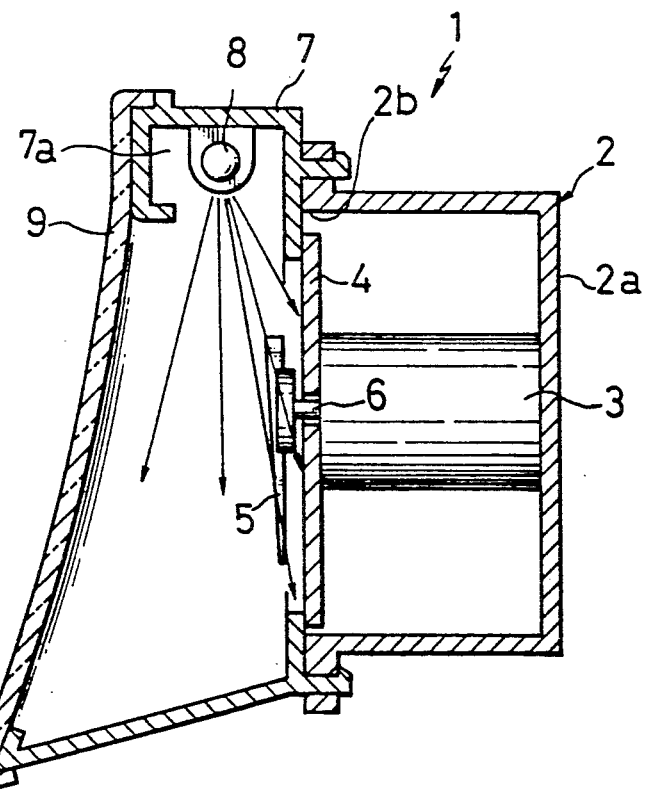
FIG. 2 is a cross-sectional view taken along line II—II in FIG. 1.

FIG. 1 shows indicators 1a, 1b, such as a speedmeter or a tachometer for use in motor vehicles or the like. As shown in FIG. 2, each of the indicators 1a, 1b comprises a casing 2 having a closed rear end 2a and an open front end 1b. In the casing 2, there is disposed a movement 3. On the front portion of the movement 3, there is provided a scale plate 4 which is positioned at the open front end 2b of the casing 2. On the front side of the scale plate 4, there is rotatably disposed a pointer 5. The pointer 5 is operatively connected through a shaft 6 to the movement 3. On the front open end 2b of the casing 2, there is provided a hood 7 having a substantially cylindrical shape so as to allow sight of the scale plate 4 therethrough from the outside. On the inner upper portion of the hood 7, there is provided an ultraviolet lamp accommodating section 7a. In the ultraviolet lamp accommodating section 7a, there is disposed an ultraviolet light source such as ultraviolet lamp 8 for illuminating the scale plate 4. Further, on the front side of the hood 7, there is provided a transparent front cover 9.

FIG. 3A shows the scale plate 4. The scale plate 4 is formed from a polycarbonate plate having a substantially semi-circular shape, which is formed by punching. On the front surface of the scale plate 4, a base painting made of dark color paint such as black paint is applied. The base painting forms a ground color of the scale plate 4.

On the base painting of the scale plate 4, there is provided a plurality of indicia 10, such as scales and numerals. In cooperation with the pointer 5, these indicia 10 indicate a specific value, such as the speed of the motor vehicle. The indicia 10 comprise a first indicia arrangement 11 and a second indicia arrangement 14 which is located on the outer side of the first indicia arrangement 11 concentrically.

the first indicia arrangement 11 which comprises scales 12 and numerals 13 is located on the inner side of the scale plate 4a. The indicia 12 and 13 in the first arrangement 11 are printed on the base painting with normal ink, which contains no fluorescent brightener therein, by silk-screen printing. The color of the ink used in the first indicia arrangement has a sufficient lightness and contrast with respect to the base painting, so that in the daytime the first indicia arrangement is clearly displayed as shown in FIG. 3B.

Outside the first indicia arrangement 11 on the base painting of the scale plate 4, there is provided a second indicia arrangement 14 which comprises scales 15 and numerals 16. Since the indicia in the second indicia arrangement 14 are concentrically located to those of the first indicia arrangement 11, so that each corresponding indicia in he first and second indicia arrangements 11, 14 indicate the same value to each other. The indicia in the second arrangement 14 are printed with an ink containing fluorescent brightener therein. As the fluorescent brightener, uranine, eosin, thioflavine T, rhodamine B, or the like can be used.

In this embodiment, a transparent ink or an ink having substantially the same color as that of the base painting is used as the ink for printing the indicia of the second indicia arrangement 14. Therefore, the indicia 15, 16 in the second indicia arrangement 14 are not visible in normal daylight. Namely, in the case where the ultraviolet lamp 8 is turned off, the indicia 15, 16 of the second indicia arrangement 14 fade away into the ground color of the base painting of the scale plate 4, so that as shown in FIG. 3B, only the first indicia arrangement 11 is visible on the scale plate 4.

In the case where the ultraviolet lamp 8 is turned on, such as at nighttime, the indicia 15, 16 in the second indicia arrangement 14 become visible due to the light from the ultraviolet lamp 8, so that the second indicia arrangement 14 will be visible on the scale plate 4. In this case, since the circumference of the indicator is dark, the indicia 12, 13 in the first indicia arrangement 11 fade away into the ground color of the base painting due to the loss of contrast and lightness between the ground color of the base painting and that of the indicia.

Therefore, as shown in FIG. 3C, only the indicia 15, 16 of the second indicia arrangement 14 are visibly displayed on the scale plate 4. As a result, when the ultraviolet lamp 8 is turned on, indication different from that appearing during the daytime can be obtained, whereby a useful change in the visibility of the indicator will be achieved.

Figure 4:
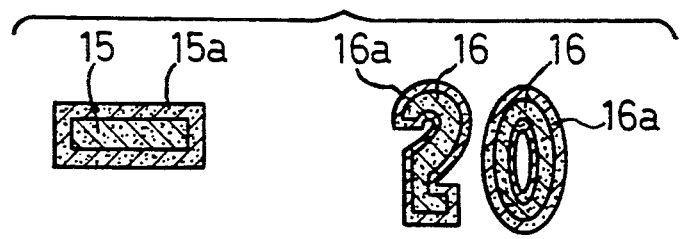
FIG. 4 is an enlarged view of an indicia showing a modification of the indicia of the first embodiment of the present invention.

In this embodiment, as shown in FIG. 4, each indicia 15, 16 in the second indicia arrangement 14 may have an edge portion 15a, 16a formed therearound. In this case, each indicia 15, 16 in the second indicia arrangement 14 is formed from an ink having a color different from that of the base painting and contains fluorescent brightener therein, and the edge portion 15a, 16a is formed from a transparent ink containing fluorescent brightener or an ink having the same color as that of the base painting and containing fluorescent brightener therein.

According to the indicator having such indicia as described above, since the edge portion 15a, 16a of each indicia 15, 16 will be visible only when the ultraviolet light source is turned on, in addition to the visibility of the indicia 15, 16 of the second indicia arrangement 14, each indicia is enlarged and becomes more clearly visible. As a result, the overall visibility of the indicia during the nighttime is improved.

Figure 5:
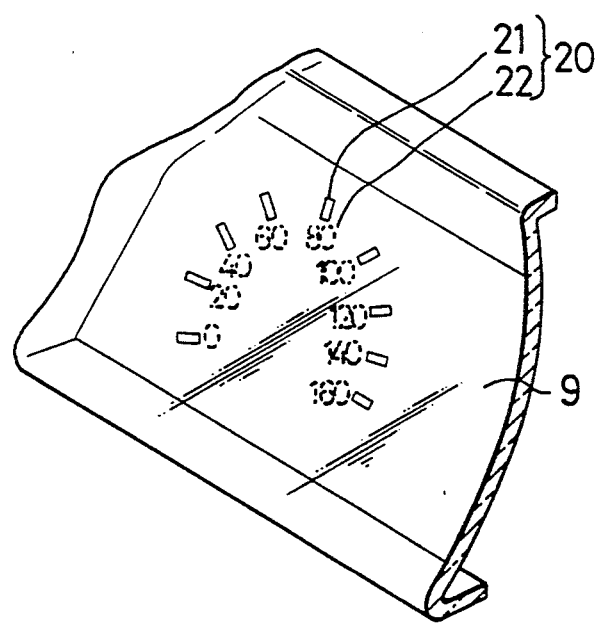
FIG. 5 is an explanatory drawing of a second embodiment of the indicator of the present invention.

FIG. 5 shows a second embodiment of the present invention. In this embodiment, on the front cover 9 of the indicator 1, indicia 20 comprising scales 21 and numerals 22 are formed by printing with a transparent ink containing fluorescent brightener therein. The position of the indicia 20 on the front cover 9 is set in such a manner that the indicia 20 on the front cover 9 correspond to those of the scale plate 4 (not shown). In this embodiment, of course, the indicia on the scale plate 4 are formed from normal ink containing no fluorescent brightener.

In this second embodiment, when the ultraviolet lamp 8 is turned on, the indicia 20 on the front cover will be displayed thereon. Therefore, according to this embodiment, three-dimensional indication can be obtained.

It must be understood that the invention is in no way limited to the above embodiments that many changes may be brought about therein without departing from the scope of the invention as defined by the appended claims.

What is claimed is:
1. An indicator, comprising:
a) a scale plate having a ground color;
b) a pointer having a rotation axis and being rotatably disposed on said scale plate;
c) an ultraviolet light source of illumination;
d) first indicia means for indicating a specific value in cooperation with the pointer, arranged on the scale plate and arrayed concentrically with respect to the rotation axis of the pointer so as to enable indication of the specific value by said first indicia arrangement, and visible only under the daylight condition in which the ultraviolet light source is normally turned off, and wherein the first indicia arrangement is formed of ink which contains no fluorescent brightener therein and has a color which substantially fades into the ground color of said scale plate under low levels of visible light; and
e) second indicia means for indicating a specific value in cooperation with said pointer, spaced from said first indicia and arrayed concentrically thereto and with respect to said rotation axis of the pointer, wherein said second indicia arrangement comprises a transparent paint containing fluorescent brightener which fluoresces only when exposed to the ultraviolet light source under conditions of low levels of visible light and which is formed so as to fade into the ground color of the scale plate under daylight conditions, wherein the visible arrangement of the indicia on the scale plate is changed between the daylight condition and the low visible light level condition when exposed to the ultraviolet light,
wherein the indicator further comprises a transparent front cover mounted in front of the scale plate, said front cover includes portions which overlap corresponding portions on said scale plate, and wherein the second indicia arrangement is formed on portions of the front cover which overlap corresponding portions on said scale plate.

2. The indicator as claimed in claim 1, wherein the second indicia arrangement is located concentrically outside the first indicia arrangement.

3. An indicator, comprising:
a scale plate having a certain ground color;
a pointer having a rotation axis and being rotatably disposed on said scale plate;
an ultraviolet light source for illuminating the scale plate;

a transparent front cover mounted in front of the scale plate; and first and second indicia arrangements for indicating a specific value in cooperation with the pointer, the first and second indicia arrangements being spaced from each other and arrayed concentrically to each other with respect to the rotation axis of the pointer so as to enable indication of the specific value by either the first or second indicia arrangement is formed on the front cover so as to be visible only under the daylight condition in which the ultraviolet light source is normally turned off and to fade substantially into the ground color of the scale plate under low levels of visible light, while the second indicia arrangement containing fluorescent brightener therein is formed on the scale plate so as to fluoresce only when the ultraviolet light source is turned on under conditions of low levels of visible light and is formed so as to fade into the ground color of the scale plate under daylight conditions, wherein the visible arrangement of the indicia is changed three-dimensionally between the daylight condition and the low level visible light condition in which the ultraviolet light source is turned on.

4. The indicator as claimed in claim 3, the second indicia arrangement being formed of a transparent paint containing fluorescent brightener therein, and the first indicia arrangement being formed of an ink containing no fluorescent brightener and which has a color which fades into the ground color of the scale plate under low levels of visible light.

* * * * *

UNITED STATES PATENT AND TRADEMARK OFFICE
CERTIFICATE OF CORRECTION

PATENT NO. : 5,130,548
DATED : July 14, 1992
INVENTOR(S) : Katsuma Sano et al

It is certified that error appears in the above-indentified patent and that said Letters Patent is hereby corrected as shown below:

Column 2, line 1, "maybe" should be --may be--;
line 34, "1b" should be --2b--.

Column 4, line 14, after "embodiments" insert --and--.

IN THE CLAIMS:

Column 5, claim 3, lines 9 and 10, after "arrangement" insert --, in which the first indicia arrangement--.

Signed and Sealed this

Fourteenth Day of September, 1993

Attest:

BRUCE LEHMAN

*Attesting Officer*   *Commissioner of Patents and Trademarks*